A. H. CANDEE.
SYSTEM OF CONTROL.
APPLICATION FILED DEC. 22, 1919.
1,435,207.
Patented Nov. 14, 1922.
2 SHEETS—SHEET 1.
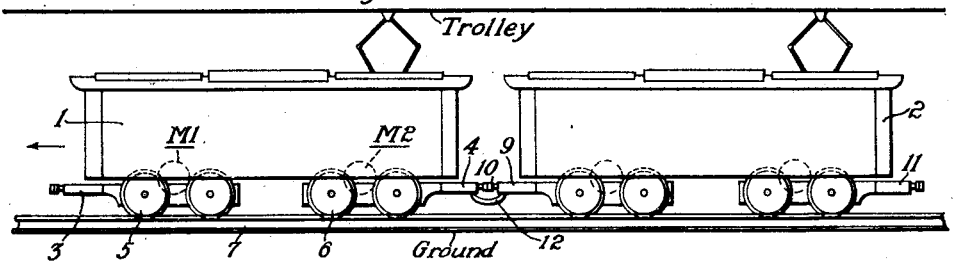
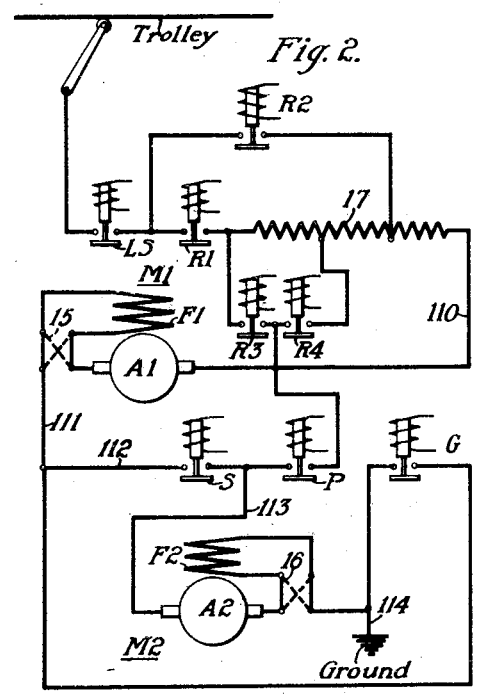
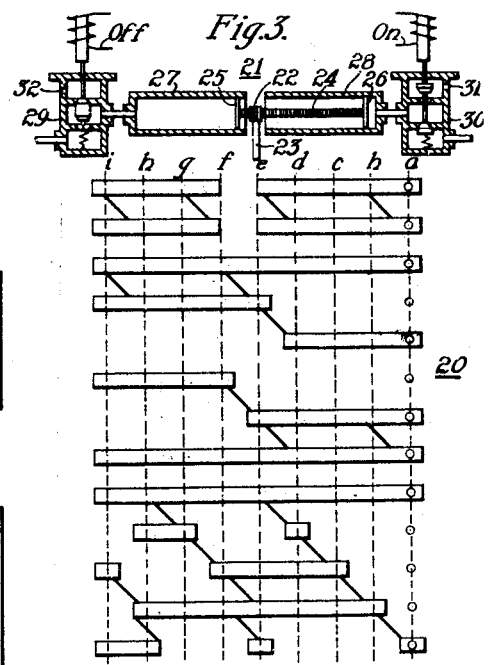
Fig. 5.
WITNESSES:
H. J. Shelhamer
W. R. Coley
INVENTOR
Andrew H. Candee
BY
Wesley Glass
ATTORNEY

A. H. CANDEE.
SYSTEM OF CONTROL.
APPLICATION FILED DEC. 22, 1919.

1,435,207.

Patented Nov. 14, 1922.

WITNESSES:
H. T. Shelhamer
W. R. Coley

INVENTOR
Andrew H. Candee
BY
Wesley G. Carr
ATTORNEY

Patented Nov. 14, 1922.

1,435,207

UNITED STATES PATENT OFFICE.

ANDREW H. CANDEE, OF PITTSBURGH, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

Application filed December 22, 1919. Serial No. 346,603.

*To all whom it may concern:*

Be it known that I, ANDREW H. CANDEE, a citizen of the United States, and a resident of Pittsburgh, in the county of Allegheny and State of Pennsylvania, have invented a new and useful Improvement in Systems of Control, of which the following is a specification.

My invention relates to systems of control for dynamo-electric machines and it has special relation to the multiple-unit control of electric vehicles or trains.

One object of my invention is to provide a simple but reliable control system of the above-indicated character wherein a controller on one vehicle serves to govern the driving units on all vehicles and is itself governed by a hand-operated master or "remote-control" controller.

Another object of my invention is to provide a system of the multiple-unit type wherein the master controller governs the line switches and the motor reversers on all cars and a sequence switch on the corresponding vehicle only, this sequence switch operating on a predetermined time basis and serving to govern the operation of driving units on all of the vehicles.

In the prior art, it has been customary, in some cases, to control sets of switches, or the equivalent, by means of current relays on the respective vehicles of a multiple-unit train. Thus, although the primary control of a train was effected from a single master controller on the front platform, nevertheless, the acceleration of the individual motors on the different vehicles was dependent upon the current traversing each motor. However, in my present invention, the acceleration of the motors is effected on a predetermined time basis and, consequently, it becomes desirable to concurrently govern all of the vehicle motors from a single device. This operation is provided in a simple and reliable manner by means of my invention.

Other objects of my invention relating to the interlocking or arrangement of circuits to prevent false operation and, in general, to provide a relatively simple and reliable control system of the class in question will become evident from the following detailed description taken in conjunction with the accompanying drawings, wherein—

Figure 1 is an outline view of a plurality of electric vehicles upon which my present invention may be installed;

Fig. 2 is a diagrammatic view of the main circuits for the driving units on each vehicle;

Fig. 3 is a diagrammatic view of my sequence switch and the operating means therefor;

Fig. 5 is a sequence chart, of well-known form, indicating the preferred order of operation of the various motor-controlling switches.

Figure 4:
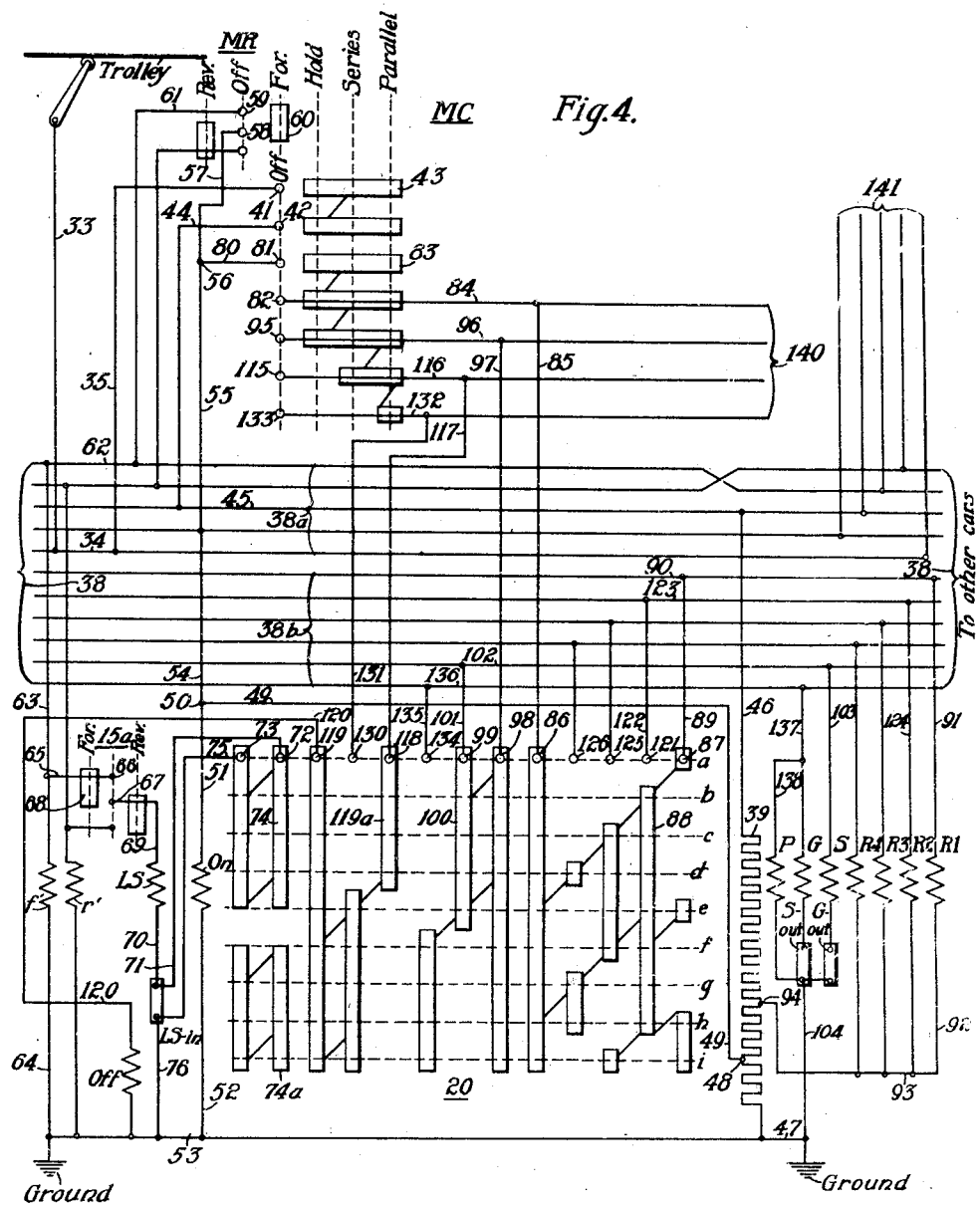
Fig. 4 is a diagrammatic view of an auxiliary control system for governing the operation of the sets of switches that are associated with the driving units on each vehicle.

Referring to Fig. 1 of the drawings, a plurality of electric cars or vehicles 1 and 2 of the familiar multiple-unit type comprise the customary sets of trucks 3 and 4 on the vehicle 1, and 9 and 11 on the vehicle 2, together with the necessary sets of wheels 5 and 6 which run along track rails 7. The respective sets of wheels 5 and 6 are driven, in any suitable manner, by electric motors M1 and M2. The adjacent truck members 4 and 9 are mechanically connected by means of a familiar coupling 10, and a jumper cable 12, between the vehicles 1 and 2, serves to permit multiple-unit operation of the "remote-control" type, as hereinafter described in detail.

Referring to Fig. 2, the main circuit of the driving-unit system installed upon each vehicle comprises the motors M1 and M2, which are supplied with energy from a suitable supply circuit including conductors trolley and ground, these motors respectively being provided with commutator-type armatures A1 and A2 and series field windings F1 and F2. Reversing switches 15 and 16 of a familiar electrically-controlled type, which preferably employ a single drum controller, are here shown in a conventional manner for the sake of simplicity, and are connected in the usual way to effect reversal of the field windings F1 and F2 with respect to the corresponding armatures A1 and A2. A multi-section accelerating resistor 17 is adapted to be variably connected in circuit with the motors M1 and M2 through the agency of a plurality of resistor-controlling switches R1, R2, R3 and R4. A line switch LS serves to connect the motors to the trolley, while a series-connecting switch S is employed during series operation of the motors, and parallel-connecting switches P and G are utilized to connect the motors in parallel relation, as subsequently more fully explained.

Fig. 3 illustrates my sequence switch 20 and its operating means 21, which are installed upon each vehicle. The sequence switch is preferably of the familiar drum type comprising a plurality of alined control fingers and a number of contact segments for engaging the control fingers in a certain sequence which will be explained in detail in connection with Fig. 4.

The operating means 21 for the sequence switch is, in general, of a familiar electrically-controlled, pneumatically-actuated type and comprises a pinion 22 which is rigidly secured to the operating shaft 23 of the sequence switch 20 to mesh with a transversely movable rack member 24, the opposite ends of which constitute pistons 25 and 26 that travel within suitable operating cylinders 27 and 28. A normally open double-beat valve 29, which is provided with an actuating coil Off, serves to effect communication from a suitable source (not shown) of fluid, under pressure, to the operating cylinder 27, while a second normally closed double-beat valve 30, having an actuating coil On, serves to initially connect the cylinder 28 with the atmosphere through a port or exhaust opening 31.

The port or exhaust opening 32 for the valve 29 is relatively small or restricted in size, whereby the forward movement of the sequence switch 20 is effected at a relatively slow rate, whereas the return movement of the controller to the illustrated normal position is produced at a much more rapid rate by reason of the larger exhaust port 31 in the valve 30.

By reason of the provision of the small exhaust port 32, the sequence switch 20 is actuated through its successive positions $a$ to $i$, inclusive, on a predetermined time basis, and the movement thereof is independent of current relays or limit switches and the like. It will be appreciated that any other method of actuating the sequence switch 20 in accordance with a predetermined time element, rather than the intermittent current-controlled actuation that is familiar in the prior art, may be employed, if desired. Furthermore, it will be appreciated that the size of the exhaust port 32 in the valve 29 may be adjusted to suit any given operating conditions, whereby the period of acceleration of the motors, corresponding to the time required to move the sequence switch 20 to its final operative position $i$, may be regulated. One such adjusting means is shown in a copending application of Karl A. Simmon, Serial No. 342,118, filed Dec. 3, 1919, and assigned to the Westinghouse Electric & Manufacturing Company.

The operation of the actuating mechanism 21, without regard to the electrical connections effected thereby, may be set forth as follows. The pistons 25 and 26 are normally biased toward the illustrated extreme right-hand position by reason of the presence of fluid under high pressure in the operating cylinder 27, whereas the other cylinder 28 is connected to the atmosphere through the exhaust port 31. Upon concurrent energization of the actuating coils Off and On, however, the pressure conditions in the mechanism are reversed, that is, fluid under high pressure is admitted to the operating cylinder 28 through the valve 30, while fluid, under pressure, is released from the other cylinder 27, through the valve 29 and the exhaust port 32, to the atmosphere. The rate of movement of the sequence switch 20 through its successive operative positions is thus dependent upon the rate of exhaust of fluid pressure through the port 32, as previously explained.

To effect return movement of the sequence switch 20 and the operating mechanism 21, the actuating coils On and Off are concurrently de-energized, whereupon fluid-pressure conditions in the apparatus revert to the original state and a rapid backward movement of the device to the normal illustrated position $a$ is effected by reason of the relatively large size of the exhaust port 31 in the valve 30.

Referring to the auxiliary control circuits shown in Fig. 4, the sequence switch 20 is shown as connected to a plurality of train-line conductors 38, which extend from one vehicle to another, by means of the jumper cable 12 that is illustrated in Fig. 1, and is also connected to a master controller or primary governing switch MC of the hand-operated type. The master controller is provided with a plurality of operative positions respectively marked "Hold," "Series" and "Parallel."

A master reverser MR is provided with the usual positions "forward," "off" and "reverse" for governing the actuating coils $f'$ and $r'$ of the main-circuit reverser comprising reversing switches 15 and 16. The actuating coil of the line switch LS is governed from the main reverser and also from the master controller MC in accordance with a familiar practice and, furthermore, the actuating coil On and a control resistor 39 are directly governed by the master controller MC.

On the other hand, the motor-controlling switches P, G, S and R1 to R4, inclusive, are governed directly from the sequence switch 20.

Assuming that it is desired to effect forward acceleration of the train illustrated in Fig. 1 and that the master reverser and main reverser in vehicle 1 occupy the reverse positions, the master reverser is first thrown to its "forward" position, and the master controller MC in vehicle 1 may then be actuated to its initial operative position "hold," for example, to effect forward operation of the train in the direction of the arrow shown in Fig. 1, whereby it will be seen that vehicle 1 is the leading car of the train and, consequently, the operator will be stationed on the front platform thereof.

Under such conditions, a circuit is established from the trolley through conductor 33, train-line conductor 34, conductor 35, control fingers 41 and 42, which are bridged by contact segment 43 of the master controller MC, conductor 44, train-line conductor 45, conductor 46, control resistor 39 and conductor 47 to ground. In this way, the control resistor 39 is energized from the full supply-circuit voltage and a suitably low electromotive force for the actuating coils of the various switches is provided by taps on the control resistor 39, in accordance with a well-known practice.

Upon the energization of control resistor 39, a circuit is established from a low-voltage tap 48 thereof through conductor 49, junction point 50, where the circuit divides, one branch including conductor 51, actuating coil On for the sequence switch 20 and conductors 52 and 53 to negative conductor ground. The energization of the On coil, however, does not effect any movement of the sequence switch 20, since the only result of such action is to admit fluid, under high pressure, into the operating cylinder 28 to balance the pressure already existing in the other cylinder 27.

Another branch circuit is continued from the junction-point 50 through conductors 54 and 55, junction-point 56, conductor 57, control fingers 58 and 59, which are bridged by contact segment 60, since the master reverser MR has been thrown to its "forward" position, whence circuit is continued through conductor 61, train-line conductor 62, conductor 63, forward-actuating coil $f'$ of the mail-circuit reverser and conductor 64 to ground. The main-circuit reverser, comprising switches 15 and 16, is thus actuated to its "forward" position corresponding to the full lines in Fig. 2, and, furthermore, the reverser contact members, designated by the reference character 15a in Fig. 4, assume a position wherein the contact segment corresponding to "forward" position of the reverser becomes active.

Consequently, a new circuit is continued from conductor 63 through conductor 65, control fingers 66 and 67, which are bridged by contact segment 68 of the main-circuit reverser in its "forward" position, conductor 69, actuating coil of the line switch LS, conductors 70 and 71, control fingers 72 and 73, which are bridged by contact segment 74 of the sequence switch 20, conductor 75 and 76 and negative conductor 53 to ground.

The line switch LS is thus closed and a holding circuit for the actuating coil thereof is thereupon formed by the bridging of an interlock LS-in across conductors 70 and 76. In this way, the energization of the actuating coil for the line switch LS is rendered independenet of the position of the sequence switch 20 during forward movement thereof. However, such energization is controlled by the sequence switch 20 during a predetermined portion of the return movement thereof, as hereinafter more fully described.

A further circuit is established, at this time, from the junction-point 56 through conductor 80, control fingers 81 and 82, which are bridged by contact segment 83 of the master controller, conductors 84 and 85, control fingers 86 and 87, which are bridged by contact segment 88 of the sequence switch 20, conductor 89, train-line conductor 90, conductor 91, actuating coil of the switch R1 and conductors 92 and 93 to a second intermediate tap 94 of the control resistor 39.

Still another circuit is initially established from the contact segment 83 of the master controller through control finger 95, conductors 96 and 97, control fingers 98 and 99, which are bridged by contact segment 100 of the sequence switch 20, conductor 101, train-line conductor 102, conductor 103, actuating coil of the switch S, interlock G-out, thereby ensuring that the parallel-connecting switch G has been opened, and conductor 104 to ground.

Referring temporarily to Fig. 2, the main circuits established by the closure of the above-mentioned switches LS, S and R1, which closure is indicated in step $a$ of the sequence chart, Fig. 5, may be traced as follows: from the trolley through line switch LS, switch R1, the entire accelerating resistor 17, conductor 110, armature A1, field winding F1, and reversing switch 15, conductors 111 and 112, series-connecting switch S, conductor 113, armature A2, field winding F2 and reversing switch 16, and conductor 114 to ground. The driving motors M1 and M2 on the vehicle 1 are thus connected, in series relation with the accelerating resistor 17, across the supply circuit.

Since the lower section 38b of the train-line conductors 38 is connected to corresponding sets of switches in all of the other vehicles of the train, it follows that similar main-circuit connections to those just traced are concurrently completed in the other vehicles.

Furthermore, the provision of the upper section 38a of the train-line conductors serves to ensure that the main reversers on all the vehicles occupy corresponding positions, in this case, a "forward" position, before the line switch LS on the corresponding vehicle may be closed.

In other words, it will be seen that the master controller MC, with the assistance of the master reverser MR, governs the reversing switches and the line switches on all vehicles but governs the sequence switch 20 only on the same vehicle as the active master controller. On the other hand, the sequence switch 20 controls the illustrated motor-governing switches on all of the vehicles through the agency of the illustrated train-line-conductors 38b. However, the provision of master controllers and a sequence switch on each vehicle makes it possible to employ any car as the leader, thus obviating the necessity of shunting vehicles, as would be the case if only one car thus fully equipped were employed.

Referring again to Fig. 4, upon actuation of the master controller to its position "series," a new circuit is established from the contact segment 83 through control finger 115, conductors 116 and 117, control fingers 118 and 119, which are bridged by contact segment 119a of the sequence switch, conductor 120 and the actuating coil Off to negative conductor 53. Since both the On and the Off coils are now concurrently energized, the above-described forward movement of the sequence switch 20, on a delayed time basis, is started.

Consequently, as soon as the sequence switch reaches its second position b, a new circuit is established from the contact segment 88 through control finger 121, conductor 122, train-line conductor 123, conductor 124 and the actuating coil of the switch R2 to return conductor 93. In this way, the switch R2 is closed to short-circuit a predetermined section of the accelerating resistor 17.

In a similar manner, control fingers 125 and 126 are engaged by the contact segment 88 in positions c and d, respectively, of the sequence switch 20 to effect the successive closure of the resistor-controlling switches R3 and R4. It will be noted, from an examination of the contour of the contact segment 88 or an inspection of the sequence chart, that the switch R1 is opened in positions b, c and d of the sequence switch, while switch R4 is closed only in position d thereof. It will be understood that this particular manipulation of the resistor-short-circuiting switches is not essential to the present invention, but is merely one form of gradual exclusion of the accelerating resistor 17 from circuit to effect a smooth acceleration of the driving motors to full series relation, corresponding to position e of the sequence switch.

Just before the sequence switch reaches its position e, contact segment 119a becomes disengaged from control finger 118 to effect de-energization of the actuating coil Off, whereby the sequence switch 20 is actuated into its "series" position e, but no farther, unless the master controller MC has previously been actuated or until it is subsequently actuated to its position "parallel." Under such conditions, the contact segment 119a engages a new control finger 130, whence circuit is continued, through conductors 131, 132 and the control finger 133, to the contact segment 83 of the master controller. In this way, the energization of the off coil is transferred from the "series" to the "parallel" position of the master controller.

During the movement of the sequence switch 20, from its final series position e to its initial parallel position f, the transition of the driving motors from series to parallel relation is effected as follows. A control finger 134 first engages the contact segment 100, whence circuit is continued through conductor 135, train-line conductor 136, conductors 137 and 138, actuating coil of the switch P and conductor 104 to ground. The familiar shunting connection of the motor M1 through the switches P and S is thus effected. The contact segment 100 then becomes disengaged from the control finger 99 to effect de-energization of the actuating coil of the series-connecting switch S. As soon as the switch S has opened, a branch circuit is completed from the conductor 137 through actuating coil of the switch G, interlock S-out and conductor 104 to ground.

In this way, the well-known "shunting" transition of the motors is effected and, in the first parallel position f, switches LS, G, P, R2 and R3 are closed, as indicated in step f of the sequence chart.

Movement of the sequence switch 20 through its remaining positions, g, h and i serves to manipulate the various resistor-controlling switches R1 to R4, inclusive, to effect a gradual exclusion of the accelerating resistor 17 from circuit, whereby the motors are smoothly acelerated to full-parallel relation.

In addition to the connections of the illustrated master controller MC and master reverser MR to the train-line conductors 38a, provision for double-end operation of the vehicle 1 may be readily made by means of the illustrated sets of conductors 140 and 141, which may be associated with another set of controllers corresponding to MC and MR on the opposite platform of the vehicle.

In case the train operator returns his master controller to the "off" position to shut off the power and then again actuates the master controller to an operative position, the line switch LS may be closed in any operative position of the sequence switch 20, that is to say, in any position except in the transitional region between notches *e* and *f*. In this way, considerable time is saved over the customary method of waiting until the sequence switch is returned to the first position before the line switch may be re-closed.

Such control of the line switch LS is effected partly through the agency of the contact segment 74, which has been included in a previously-traced circuit, and which serves to bridge control fingers 72 and 73 in series positions *a* to *e*, inclusive, of the sequence switch. A similar contact segment 74ª bridges control fingers 72 and 73 in positions *f* to *i*, inclusive, corresponding to parallel operation of the motors. However, the line switch is not normally opened when the sequence switch passes through its transitional position, by reason of the above-mentioned interlock LS-in that directly connects conductors 70 and 76.

On the other hand, the provision of the gap or open circuit between contact segments 74 and 74ª ensures that no short-circuit shall obtain through the switches LS, P, S and G across the supply-circuit conductors, when the sequence switch occupies a position between notches *e* and *f*, during backward movement, in case power is resumed by reason of the manipulation of the master controller MC by the train operator, or otherwise.

I do not wish to be restricted to the specific circuit connections or arrangement of parts herein set forth, as various modifications thereof may be made without departing from the spirit and scope of my invention. I desire, therefore, that only such limitations shall be imposed thereupon as are indicated in the appended claims.

I claim as my invention:

1. An electrical system comprising a plurality of working units, a plurality of sets of switches for controlling the respective units, means for governing said switches, and contact-making means for controlling the operation of said first means.

2. An electric railway system comprising a plurality of driving units on different vehicles, means on one vehicle for governing all of said units, and contact-making means on that vehicle for controlling said first means.

3. An electric railway system comprising a plurality of driving units on different vehicles, a single controller on one vehicle for governing all of said units, and a hand-operated controller on that vehicle for controlling the operation of said single controller.

4. An electric railway system comprising a plurality of driving units on different vehicles, means located on one vehicle for effecting "remote control" of all said driving units, and means on that vehicle for manually effecting "remote control" of said first means.

5. An electric railway system comprising a plurality of driving units on different vehicles, a controller on one vehicle for governing the corresponding driving units, a plurality of train-line conductors for permitting operation of driving units on another vehicle from said controller, and hand-operated means on said one vehicle for electrically governing said controller.

6. An electric railway system comprising a plurality of driving units on different vehicles, a multi-contact controller on one vehicle for effecting "remote control" of both a driving unit on the corresponding vehicle and a unit on another vehicle, electrically-governed means for actuating said controller, and a hand-operated controller directly connected to certain controller contact members and to said electrically-governed means.

7. An electric railway system comprising a plurality of driving units on different vehicles, a plurality of sets of switches including actuating coils for controlling the respective units, a multi-contact controller on one vehicle adapted to be connected in the proper sequence to the actuating coils of the switches on that vehicle, a plurality of train-line conductors connected to said controller for effecting proper sequential energization of the switch-actuating coils on another vehicle, electrically-governed means for actuating said controller, and a hand-operated controller directly connected to certain controller contact members and to said electrically-governed means.

8. An electric railway system comprising a plurality of motors on different vehicles, a controller on one vehicle for governing a certain operation of all said motors, and a hand-operated controller for governing a certain other operation of all said motors and for governing the first-named controller on the same vehicle only.

9. An electric railway system comprising a plurality of motors on different vehicles, a controller on one vehicle for governing the acceleration of all said motors, and a hand-operated controller for governing the line connection of all the motors and for governing the first-named controller on the same vehicle only.

10. An electric railway system comprising a plurality of motors on different vehicles, a controller on one vehicle for governing the series-parallel acceleration of all said motors, and a hand-operated controller for effecting the reversal of all the motors and for governing the first-named controller on the same vehicle only.

11. An electric railway system comprising a plurality of motors on different vehicles, a sequence switch and a master controller on each vehicle, a plurality of train-line conductors for enabling any one master controller to govern the reversal and line connection of all said motors, a plurality of train-line conductors for enabling the sequence switch on the same vehicle as the active master controller to govern the series-parallel acceleration of all the motors, and means for connecting the active master controller to the sequence switch on the same vehicle only.

12. The combination with an electric motor, of a controller and a switch for governing the operation thereof, and a hand-operated device for governing said controller and said switch, said controller embodying means for permitting the closure of said switch except in a predetermined position.

13. The combination with a plurality of electric motors, of a line switch therefor and a sequence controller for governing the series-parallel connections thereof, and a master controller for governing said sequence controller and said switch, said sequence controller embodying contact members for permitting the closure of said switch except in the transitional region between the "series" and the "parallel" positions.

In testimony whereof, I have hereunto subscribed my name this 15th day of December 1919.

ANDREW H. CANDEE.